March 28, 1944. F. GRUNDĚL 2,345,112

METHOD OF MOLDING PLASTIC LAYERS

Filed May 23, 1941

Inventor:
František Grundĕl,

By Pierce & Scheffler,
Attorneys.

Patented Mar. 28, 1944

2,345,112

UNITED STATES PATENT OFFICE 2,345,112

METHOD OF MOLDING PLASTIC LAYERS

František Grundĕl, Napajedla, Bohemia and Moravia; vested in the Alien Property Custodian Application May 28, 1941, Serial No. 395,688
In Bohemia and Moravia May 11, 1940

6 Claims. (Cl. 18—56)

Embossed patterns or ornamentations on the surface of sheets of plastic material, or directly on shaped articles of plastic material, have been obtained hitherto mainly by impression of the pattern or ornamentation on the material either in presses which serve at the same time for the manufacture of the articles themselves, or by traversing patterned rollers across the face of the articles, or by any other known or convenient method. It has been proposed also to produce raised ornamentation or patterns by using superatmospheric pressure of air or another fluid, the fluid pressure acting on a layer of plastic material and forcing the same against the face of a patterned form.

The manufacture in closed presses or molds is very expensive, because two-side molds having a core or the like are very costly. One-side forms, on the other hand, with which the impression of the pattern is produced by external pressure show the disadvantage that in order to obtain a sharp impression, and thus to reproduce exactly the pattern, relatively high pressures are necessary and as a consequence expensive auxiliary machinery is required for the manufacture. Moreover the manufacturing method just referred to requires attentive and very careful operation as, for instance, air bubbles confined between the layer of plastic material and the form cannot be readily removed so that they form flaws in the finished patterned surface.

It is also known to produce thin-walled rubber articles, such as for instance bathing caps, rubber gloves and the like, by the dipping method with the use of patterned forms, but this manufacturing process has various disadvantages, mainly the disadvantage that the necessary raw materials are very expensive.

The new method of manufacturing articles having superficial patterns in accordance with the present invention eliminates all the imperfections of the prior methods and moreover has several advantages. The essence of the new method consists in the use of a porous form which has the desired pattern worked in the surface thereof and on which a layer of rubber or another plastic material is applied, whereafter on the side opposite to that where the pattern is provided the form is subjected to subatmospheric pressure, whereby the layer of plastic material is efficiently drawn by suction against the patterned surface and an exact imprint of the pattern is obtained in the plastic layer.

The drawing shows two examples of carrying out the method in accordance with the invention.

Example I

Figure 1:
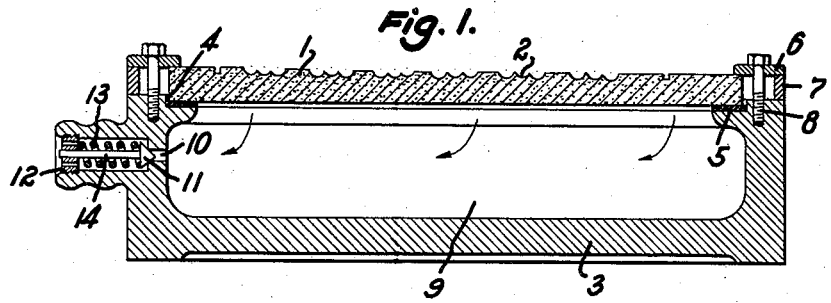
Figure 1 represents a section through a flat form.

A porous flat form 1 (Fig. 1) corresponding in shape to the articles to be manufactured has formed on the surface thereof a profiled pattern 2 which is provided both with projections and with depressions in accordance with the design which is desired to produce. A casing 3 is provided with a groove 4 to receive a packing 5 against which the flat form 1 is seated. The latter is secured to the casing 3 by means of a clamping device 6, 7, 8. The air is drawn out from the space 9 by means of a vacuum pump. The valve 11 being unseated to open an aperture 10, the air escapes outwards through ports provided in the nut 12. The valve 11 compresses the spring 13 which bears, on the one hand, against the head of the valve and, on the other hand, against the nut 12 in which the shank 14 of the valve 11 is guided.

The working method with the above described appliance is carried out in the following manner:

The porous form 1 which may be made, for instance, of wood, burnt clay, various porous alloys or the like, has applied on the patterned face thereof a layer of plastic material on which the pattern is to be reproduced, for instance a strip of non-vulcanized rolled rubber. The area of the form 1 which is not covered by the plastic material is made impervious for air on its surface by means of a paint or the like, in order to prevent air from passing through the parts of the porous wall where no rubber or any other plastic material has been applied. Before evacuation of the space 9 the form together with the plastic material thereon are subjected to the effect of heat in order to secure a more perfect penetration of the material into the depressions. Such a pre-heating is not necessary, however, if the material used is so plastic as to adapt itself easily to the surface of the form when the air is pumped out from the space 9.

After a partial heating of the whole casing with the form upon the same the vacuum pump is started to pump out the air from the internal space 9 of the casing 3 for such a length of time until the plastic material is forced by the suction into the depressions of the form. Then the suction is interrupted and the casing 3 with the form 1 is subjected in a vulcanisation container to an external super-atmospheric pressure, for instance in an air or steam medium, in which the vulcanisation is also effected in any known or convenient manner. The medium used has an influence on the nice appearance of the articles. When the vulcanisation is terminated the article is removed from the form, and that side thereof which during the manufacturing process has been directly in contact with the form, corresponds now to the front face of the finished article.

This working method permits the manufacture of any desired articles of flat shape, which subsequently may be cut into different lengths and adhesively fixed either to textile materials or to various pressed articles, such as rubber aprons and the like, whereby an improved aspect of the articles may be easily secured.

*Example II*

Figure 2:
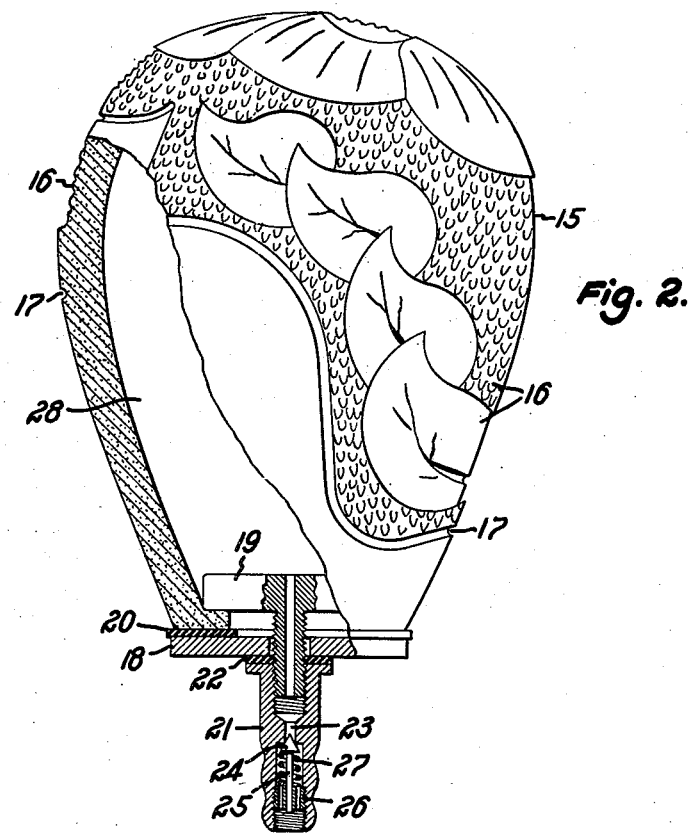
Figure 2 shows part in elevation and part in section a form for the manufacture of bathing caps.

Figure 2 shows a further embodiment of the form designed particularly for the manufacture of bathing caps.

The porous form 15 has provided on its surface a profiled pattern 16 corresponding to the design which it is desired to obtain on the finished article. A groove 17 determines the edge of the article to be manufactured. The form 15 is secured to a supporting plate 18 by a clamping member 19 which forces the form on the packing 20 against the supporting plate 18 by means of the valve body 21 which in turn bears against the plate 18 through an interposed packing 22. The valve body 21 has a port 23 controlled by a valve member 24 whose shank 25 during the opening movement of the valve passes through a nut 26 provided with ports to permit evacuation of the air. The valve is restored to its closed position by a spring 27 as soon as the evacuation has been terminated.

The manufacture of articles on the above described form is effected as follows:

Portions corresponding in shape to the articles to be manufactured are cut out from a thin layer, for instance of non-vulcanized rubber, and are placed upon the porous face of the form 15. The cut portions are caused to stick to each other either directly on the form itself, or away from the same.

The edge of the patterned article is produced by a reinforcing strip which is inserted into the groove 17 prior to the application of the plastic material on the form, so that subsequently the strip becomes integrally connected with the body of the article by the vulcanization process and then also facilitates the exact cutting of the article to the desired shape by severing the edge portions of the same along the said strip.

The form 15 thus assembled with the portions of material on the same preferably is subjected, before the evacuation of the space 28, to heating in a suitable medium, in order to facilitate the penetration of the material into the depressions of the form under the suction effect. When the form has been sufficiently heated, pumping of the air from the space 28 is started. Those parts of the form 15, which are not covered by the material, must be made impervious to air by a lacquer coating or the like in order to secure a satisfactory evacuation. The latter is carried out by a vacuum pump in the same way as in the foregoing example. When the material has been forced by the suction into the depressions of the form, the evacuation is interrupted and the material is subjected to vulcanisation directly on the form. The vulcanisation is effected in the usual manner under heating in a vulcanisation container by means of hot air or steam, either under pressure or without pressure. The vulcanisation may be effected also by the known cold method. After vulcanisation the bathing cap is removed from the form and the superfluous portions are cut off along the reinforcing strip, if necessary. Then the bathing cap is turned over to expose its front side.

The forms are so designed that the manufacturing process may be carried out without difficulty on the so called "running belt" principle.

The present invention is not limited to the embodiments described and shown and may be applied also to other devices within the scope of the appended claims.

What I claim is:

1. In the manufacture of articles made of plastic material, a method for producing raised patterns on the surface of the articles, comprising the steps of using a form made of porous material and which has the desired pattern provided in the face thereof, applying a layer of plastic material on the face of a portion only of the form, making impervious to the air the area of the form not covered by the layer and subjecting to the effect of suction the side of the form opposite to that on which the pattern is provided, whereby the layer of plastic material is drawn tightly against the patterned face of the form by the suction and an exact impression of the pattern is left in the plastic layer.

2. The method as set forth in claim 1, wherein the area of the form not covered by the layer of plastic material is coated with a paint to make it impervious to air.

3. In the manufacture of articles made of plastic material, a method for producing raised patterns on the surface of the articles, comprising the steps of using a form made of porous material which has the desired pattern provided in the face thereof, applying a layer of plastic material on the face of a portion only of the form, sealing all the edges of the layer against the form, making impervious to the air the area of the form not covered by the layer, and subjecting to the effect of suction the side of the form opposite to that on which the pattern is provided, whereby air is prevented from entering under the layer of plastic material, the latter is drawn tightly against the patterned face of the form by the effect of the suction and an exact impression of the pattern is left in the plastic layer.

4. In the manufacture of articles of plastic material, the method of producing raised patterns on the surface of the articles, comprising the steps of using a form made of porous material which has the desired pattern in the face thereof, applying a layer of plastic material on the face of the form, sealing the edges of the layer against the porous form, coating the uncovered area of the form with an impervious paint, subjecting the layer to heat, and applying suction to the side of the form opposite to that on which the pattern is applied, whereby the layer of material is drawn tightly against the patterned face of the form by the suction and an exact impression of the pattern is left permanently in the plastic layer.

5. In the manufacture of articles made of plastic material, a method for producing projecting patterns on the surface of the articles, comprising the steps of using a form made of porous material and which has the desired pattern provided in the face thereof, applying a layer of plastic material on the face of a portion only of the form, subjecting the layer to the effect of heat, sealing all the edges of the layer against the form, making impervious to air the area of the form not covered by the layer, submitting to the effect of suction the side of the form opposite to that on which the pattern is provided, and subjecting the form with the articles on the same to super-atmospheric pressure in a gaseous medium.

6. The method as set forth in claim 5, wherein the vulcanisation of the article is effected in the same gaseous medium, in which the form with the article thereon is subjected to superatmospheric pressure.

FRANTIŠEK GŘUNDĚL.